(No Model.)
F. M. STEVENS.
ELECTRIC LOCOMOTIVE.
No. 500,276. Patented June 27, 1893.
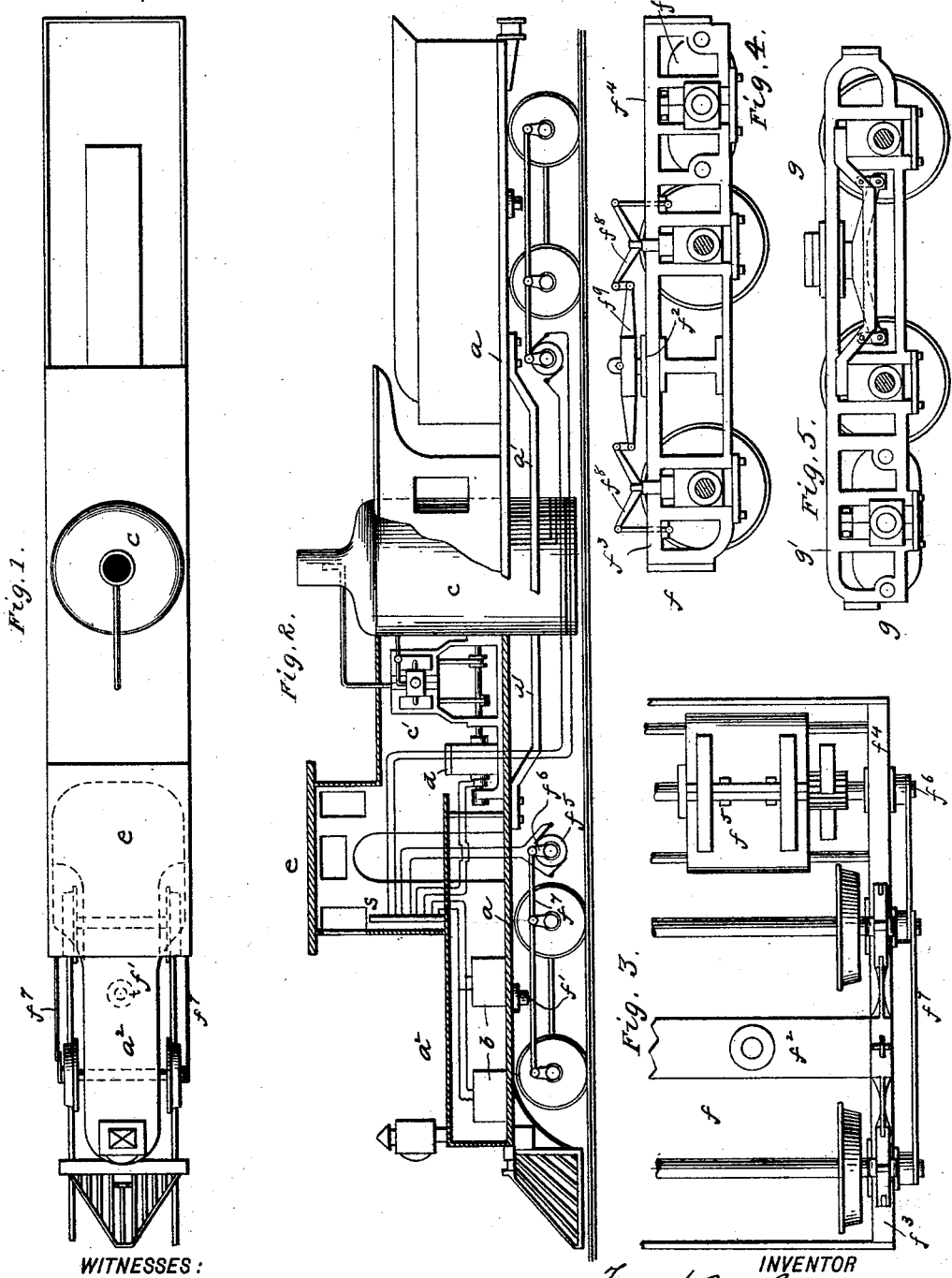
WITNESSES:
Frank S. Ober
James F. Kavanagh
INVENTOR
Frank M. Stevens
BY Wm. A. Rosenbaum
ASSO. ATTORNEY.

UNITED STATES PATENT OFFICE.

FRANK M. STEVENS, OF WHITE RIVER JUNCTION, VERMONT.

ELECTRIC LOCOMOTIVE.

SPECIFICATION forming part of Letters Patent No. 500,276, dated June 27, 1893.

Application filed February 29, 1892. Serial No. 423,111. (No model.)

*To all whom it may concern:*

Be it known that I, FRANK M. STEVENS, a citizen of the United States, residing at White River Junction, in the county of Windsor and State of Vermont, have invented certain new and useful Improvements in Electric Locomotives, of which the following is a specification.

My invention relates to electric locomotives, the object being to provide an economical, fast, safe and durable engine. By the peculiar construction of my locomotive I secure great adhesive and tractive power in proportion to the weight of the engine and tender. My invention consists in the general construction of the locomotive, as will be fully set forth in the following description and pointed out in the claims.

In the accompanying drawings, Figure 1 represents a plan of the locomotive; Fig. 2 a vertical view partially in elevation and partially in section. Fig. 3 is a plan of a portion of the forward truck. Fig. 4 is a side elevation of the same; and Fig. 5 is a side elevation of the rear truck.

Referring to the drawings by letter, $a$ represents a main frame which extends in a continuous structure from end to end throughout the engine and tender, thus uniting the two into one rigid structure. This frame is strengthened through the middle by longitudinal trusses $a'$ on each side; as a heavy weight is carried along the middle portion and as the locomotive is supported at the ends it is necessary to provide this additional strengthening truss.

Upon the rear end of the frame $a$ is constructed an ordinary engine tender carrying fuel and water for the generation of steam. The forward end of the frame is covered in by housing $a^2$ and may carry secondary batteries $b$ or other apparatus, as desired; the cow-catcher is also supported on this end in the usual manner.

In the middle of the locomotive there is placed a steam boiler $c$, a steam engine $c'$, a dynamo electric machine $d$ and the engineer's cab $e$, the floor of which is somewhat elevated as shown to enable the engineer to see ahead without difficulty.

$f$ represents the forward truck and the locomotive has a central pivot bearing upon it. This bearing $f'$ is on the cross-piece $f^2$ which rests upon the truck frame at each side thereof. The truck frame $f^3$ has a rearward extension $f^4$ in which an electric motor $f^5$ is mounted. The shaft of this motor runs parallel to the axles and carries cranks $f^6$ each connected by pitman rods $f^7$ with cranks on the outer ends of each of the axles of the forward truck. The wheels of this truck are about the size of the ordinary small or forward wheels of a steam locomotive, and in order to use such a wheel, to support the main body of the locomotive as low down as possible and to connect it to the truck by the suspension device illustrated in Fig. 4, the forward end of the main frame $a$ is narrowed and passes between the wheels of the truck as illustrated in Fig. 1. This enables me to use a small wheel and bring the center of gravity to a low point. The motor $f^5$ is located to the rear of the truck in order to bring the weight nearer the center and afford protection in case of collision. It is also nearer to the engineer at that point.

The suspension device illustrated in Fig. 4, is a well known form consisting on each side of two springs $f^8, f^8$, resting upon the axle boxes, their outer ends connected to the truck frame and their inner ends connected to a bar $f^9$ which, in turn, is connected to the truck frame. The springs and bar are located above the frame. The rear truck $g$ has a forward extension $g'$ in which another electric motor is mounted in a similar manner, to the motor $f^5$ and this motor is geared to the rear wheels in the manner above described. This truck is also centrally pivoted but as it is unnecessary to provide the suspension mounting as shown in Fig. 4, the more rigid mounting shown in Fig. 5 is adopted and the wheels placed directly under the tender. The tender may therefore be made of full width and of great capacity.

As was before stated, the boiler, engine and dynamo are located between the trucks and as there are no driving wheels at this location, there is plenty of room for this apparatus. A large fire-grate may be put in and increased boiler surface and capacity be obtained. There is plenty of room for an engine, which I prefer to be of the vertical type and provided with cut-off valves, and also plenty of room for the dynamo. Electric wires lead from the dynamo to a switch-board s in the cab; thence current is distributed to the motors or to the storage battery which may be kept charged for use in case of disability of the steam or electric generator.

If desired, wires may be used and flexible connections from the locomotive to the train and with translating devices of any description, such as lights, heaters and signals operated.

It will be observed that as the whole engine is supported low, it will not be liable to leave the track. The weight being in the middle and supported at the ends also imparts great tractive power and a tendency to hold the locomotive on the track.

Having thus described my invention, I claim—

1. In a locomotive, a single continuous frame supported at the ends on two separate trucks, an electro-motor carried on each truck at the inner end thereof, a crank on the end of the axle of each motor connected by a pitman to cranks on the axles of both wheels of the truck, a tender supported on the frame above the hinder truck, a chamber for storage batteries on the frame above the front truck, a cab above said chamber, a dynamo machine, and a prime source of power, both supported on the frame intermediate of the two trucks, substantially as described.

2. A center-bearing truck, having a frame extended beyond the wheel base, with an electric motor in the extension, crank arms on the wheels and on the armature of the motor, and coupling rods connecting the crank arms, substantially as described.

In witness whereof I have hereunto signed my name in the presence of two subscribing witnesses.

FRANK M. STEVENS.

Witnesses:
J. L. BACON,
ED. DAVIS.